United States Patent Office 3,223,715
Patented Dec. 14, 1965

3,223,715
EPOXIDIZED POLYCARBOXYLATES AND RESINOUS COMPOSITIONS CONTAINING SAME
William M. Kraft, Verona, and Richard Green, Livingston, N.J., assignors, by mesne assignments, to Tenneco Chemicals, Inc., a corporation of Delaware
No Drawing. Filed Apr. 3, 1962, Ser. No. 184,683
7 Claims. (Cl. 260—348)

This invention relates to epoxidized polycarboxylates and to methods for their preparation. It further relates to vinyl halide resin compositions that contain these epoxidized polycarboxylates as plasticizers.

The rapidly expanding industry utilizing vinyl halide resins has created a need for plasticizers that will render the finished articles of manufacture more useful, more versatile in application, and more nearly permanent. Plasticizers are required, for example, to reduce the molding temperature of the vinyl halide resin and to increase the strength, flexibility, and toughness of films that may be calendered, cast, or deposited from solutions. To be useful in vinyl halide resin compositions, the plasticizers should exhibit substantial compatibility or solvating power for the resins, they should resist extraction by oils or water, they should not exude from the plasticized resin compositions and they should not volatilize or migrate to other objects in contact with the plasticized compositions. In addition plasticizers should be non-toxic, non-corrosive, free from objectionable odors, light in color, and stable at elevated temperatures. They should also retain their effectiveness at low temperatures so that the plasticized resin compositions do not become brittle when cooled.

In accordance with the present invention, it has been found that vinyl halide resin compositions that contain certain epoxidized polycarboxylates are characterized by an excellent combination of properties. These epoxidized polycarboxylates have excellent compatibility and long-term retention of compatibility with vinyl halide resins. They impart to the resinous compositions a high degree of low temperature flexibility, high mechanical strength, and good resistance to extraction by oils, solvents, and soaps. In addition resinous compositions containing these novel plasticizers have good color and excellent stability on exposure to heat and to light.

The epoxidized polycarboxylates that have been found to be valuable as plasticizers for vinyl halide resins have the general formula

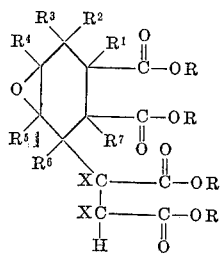

In this formula each R represents an alkyl group containing from 1 to 18 carbon atoms or an aryl group; $R^1$, $R^2$, $R^4$, $R^5$, $R^6$, and $R^7$, which may be alike or different, represent hydrogen atoms or alkyl groups containing from 1 to 4 carbon atoms; $R^3$ represents a hydrogen atom, an alkyl group containing from 1 to 4 carbon atoms, or the

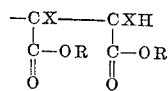

group
and each X represents a hydrogen atom, a halogen atom, a lower alkyl group, or an aryl group.

The preferred compounds for use as plasticizers are those in which R represents an alkyl group containing from 4 to 10 carbon atoms; $R^1$, $R^2$, $R^4$, $R^5$, $R^6$, $R^7$, and X represent hydrogen atoms; and $R^3$ represents a hydrogen atom or the group

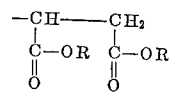

These preferred epoxidized polycarboxylates may be represented by the following formulas:

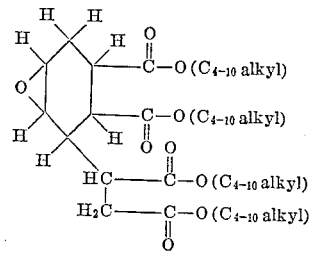

and

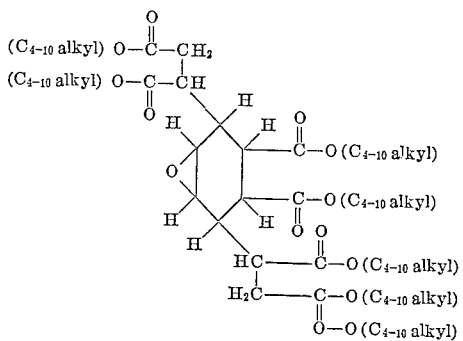

A single epoxidized polycarboxylate or a mixture of two or more of these compounds may be used as the plasticizer in vinyl halide resin compositions.

The epoxidized polycarboxylates of the present invention may be prepared by any convenient procedure. For example, they may be prepared by heating an ester of the appropriate 4,5-epoxy-cyclohexane-1,2-dicarboxylic acid with an ester of an α,β-ethylenically unsaturated dicarboxylic acid in the presence of a free radical promoter. The resulting products, which are substantially free of polymeric materials, consist principally of non-resinous products of the addition of one or two moles of the unsaturated acid esters to one mole of the 4,5-epoxy-cyclohexane-1,2-dicarboxylate.

The 4,5-epoxycyclohexane-1,2-dicarboxylates that may be used in the preparation of the epoxidized polycarboxylates have the general formula

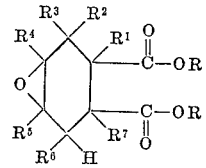

In this formula each R represents an aryl group containing from 1 to 18 carbon atoms or an alkyl group. Illustrative of the groups that R may represent are methyl, propyl, hexyl, 2-ethylhexyl, decyl, dodecyl, octadecyl, phenyl, chlorophenyl, tolyl, hydroxyphenyl, naphthyl, and the like. $R^1$ to $R^7$ each represents a hydrogen atom or an alkyl group containing from 1 to 4 carbon atoms and may represent the same or different substituents.

The 4,5-epoxycyclohexane-1,2-dicarboxylic acid esters may be prepared by the oxidation of a 4-cyclohexene-1,2- dicarboxylic acid ester with peracetic acid or acetaldehyde monoperacetate. The dicarboxylic acids used as the starting material in this process may be readily obtained by the Diels-Alder reaction of an olefinic anhydride ester and a diolefinic aliphatic hydrocarbon. A procedure by which these esters may be prepared is described in Phillips et al. Patent No. 2,794,030.

The esters with which the aforementioned 4,5-epoxycyclohexane-1,2-dicarboxylic acid esters are reacted to form the epoxidized polycarboxylates have the formula

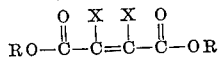

wherein each R represents an alkyl group containing from 1 to 18 carbon atoms or an aryl group and each X represents a hydrogen atom, a halogen atom, an alkyl group, or an aryl group. Useful esters include, for example, the methyl, ethyl, propyl, octyl, decyl, hexadecyl, octadecyl, phenyl, chlorophenyl, tolyl, and hydroxyphenyl esters of maleic acid, maleic anhydride, fumaric acid, itaconic acid, citraconic acid, citraconic anhydride, mesaconic acid, chloromaleic acid, chloromaleic anhydride, bromomaleic anhydride, chlorofumaric acid, bromofumaric acid, phenymaleic acid, and the like. The preferred esters are those obtained by the esterification of maleic anhydride or fumaric acid with an alkanol containing 4 to 10 carbon atoms or a mixture of such alkanols, for example, dibutyl maleate, dibutyl fumarate, dihexyl maleate, dioctyl maleate, dioctyl fumarate, didecyl maleate, didecyl fumarate, butyl hexyl maleate, and hexyl octyl fumarate.

The reaction of the 4,5-epoxycyclohexane-1,2-dicarboxylic acid ester with the ester of the unsaturated dicarboxylic acid ester may be effected by heating the reactants together at a temperature between approximately 30° C. and 250° C. and preferably between 150° C. and 200° C. in the presence or absence of an inert solvent and in the presence of a free-radical promoter.

The free-radical promoter that is used in the reaction may be any of the catalysts that are known to promote the formation of free radicals. These include, for example, benzoyl peroxide, acetyl peroxide, lauroyl peroxide, stearoyl peroxide, cumene hydroperoxide, p-menthane hydroperoxide, tert. butyl peracetate, tert. butyl perbenzoate, azobisbutyronitrile, azobisbutyramide, azobisbutyrate esters, and the like. A single free-radical promoter catalyst or a mixture of these catalysts may be used. Generally approximately 1% to 10% and preferably 2% to 5% of the catalyst, based on the weight of the reactants, is used.

Generally at least one mole of the α,β-ethylenically unsaturated dicarboxylic acid ester is used per mole of the 4,5-epoxycyclohexane-1,2-dicarboxylic acid ester, with the amount in each case depending on the properties desired in the product. When approximately equimolar amounts of the reactants are used, the product consists largely of the product of the addition of one mole of the unsaturated dicarboxylic acid ester per mole of the 4,5-epoxycyclohexane-1,2-dicarboxylic acid ester. The use of 1.2 to 2 moles of the unsaturated acid ester per mole of the epoxidized acid ester yields products that are mixtures of 1:1 and 2:1 (unsaturated acid ester:epoxidized acid ester) addition products. More than 2 moles of the unsaturated acid ester per mole of the epoxidized acid ester is used when it is desired that the product consist principally of the 2:1 addition product. In each case the unsaturated acid ester is added to the carbon atom in the 3 and/or the 6 position of the cycloaliphatic ring, that is, to the carbon atom or atoms α to the carbon atoms to which the oxirane oxygen atom is attached.

Both the 1:1 and 2:1 addition products are useful as plasticizers for vinyl halide resins. In general the 2:1 addition products are less volatile, are more viscous, and have greater compatibility than the 1:1 addition products and have different extraction properties. For most purposes the 1:1 addition products and mixtures of the 1:1 and 2:1 addition products are preferred as plasticizers for vinyl halide resins.

The epoxidized polycarboxylates are stable, high-boiling, clear materials which range from viscous liquids to semi-solid masses. They may be advantageously employed for a variety of industrial purposes, for example, as lubricant additives or as intermediates in the production of surface-active agents. They are particularly valuable as plasticizers for vinyl halide resins, serving not only to soften the resins but also to impart to them a number of valuable properties.

Various formulations containing the epoxidized polycarboxylates as plasticizers show an all-around performance substantially equal or superior to that of conventionally modified compositions. The novel resinous compositions show low brittle points and low volatility and are resistant to solvent extraction to an extent substantially the same as or superior to di-2-ethylhexyl phthalate-modified compositions. The epoxidized polycarboxylates are compatible with vinyl halide resin compositions and show little or no exudation even at high plasticizer contents. In addition vinyl halide resin compositions that contain the epoxidized polycarboxylates as plasticizer are characterized by good heat and light stability and good mechanical properties.

The amount of the present plasticizers used may be varied over a wide range depending upon the properties desired in the plasticized resin. The amount of plasticizer used is ordinarily in the range of 5 to 100 parts per 100 parts by weight of the vinyl halide resin. In most instances, the plasticizers are used in amounts ranging from 10 to 90 parts per 100 parts of resin. The resinous compositions may contain other plasticizers in addition to the novel epoxidized polycarboxylates. Heat and light stabilizers, dyes, pigments, solvents, fillers, extenders, and the like may also be present in the amounts ordinarily employed for these purposes.

The halogen-containing resins in which the epoxidized polycarboxylates may be used as plasticizers are the resinous products obtained by the polymerization of a vinyl halide in the presence or the absence of another polymerizable compound. The term "vinyl halide resin" as used herein includes vinyl halide homopolymers, such as polyvinyl chloride, polyvinyl bromide, and polyvinylidene chloride, as well as copolymers formed by the copolymerization of a vinyl halide with at least one other polymerizable mono-olefin, such as vinyl acetate, vinyl propionate, vinyl butyrate, vinylidene chloride, styrene, methyl methacrylate, dialkyl fumarates, dialkyl maleates, and the like. The vinyl halide used is ordinarily and preferably the chloride, but the bromide and fluoride may also be used. The copolymers useful in the practice of this invention are those prepared from at least 70% of a vinyl halide and up to 30% of the other polymerizable mono-olefinic compound.

The present plasticizers may be incorporated in the vinyl halide resin by any suitable process, such as calendering, mixing, or kneading of the ingredients. For example the vinyl halide resin, plasticizer, and other ingredients may be mixed together with or without the aid of a volatile solvent and the resulting mixture milled on rolls at 200° F. to 350° F. until it is homogeneous. The resin may then be removed from the mill in the form of a sheet or film of the desired thickness which may be used as such or subjected to polishing or embossing treatment. Alternately, the plasticizer may be incorporated by dissolving it in a solution of the resin and subsequently recovering the plasticized resin.

The preparation of the novel plasticizers and their use in vinyl halide resin compositions are illustrated by the examples that follow. It is to be understood, however, that these examples are given solely for the purpose of illustration and that the invention is not to be regarded as being limited to any of the specified materials or conditions recited therein except as set forth in the appended claims.

Example 1

To a flask equipped with a mechanical stirrer and a Dean-Stark trap surmounted by a reflux condenser were added 523 grams (1.1 moles) of di(isodecyl) 4,5-epoxycyclohexane-1,2-dicarboxylate, 228 grams (1.1 moles) of dibutyl furmate, and 22.8 grams of tert. butyl peroxide. This mixture was heated to 150° C. in 30 minutes and held at that temperature for 5.5 hours. The resulting reaction mixture was heated to 225° C./3 mm. to distill off water and unreacted di(isodecyl) 4,5-epoxycyclohexane-1,2-dicarboxylate and dibutyl fumarate. The residue, which weighed 737.7 grams, had an iodine number of 4.9, a saponification number of 278.4, and an oxirane oxygen content of 2.14% (calculated for the 1:1 addition product of di(isodecyl) 4,5-epoxycyclohexane-1,2-dicarboxylate and dibutyl fumarate:iodine number, 0; saponification number 291; and oxirane oxygen content; 2.10%).

Example 2

A mixture of 266.5 grams (0.57 mole) of di(isodecyl) 4,5-epoxycyclohexane-1,2-dicarboxylate, 228 grams (1.1 moles) of dibutyl maleate, and 15 grams of tert. butyl peroxide was heated to 150° C. in an hour and held at that temperature for 7 hours. The resulting reaction mixture was heated to 225°/3 mm. to distill off water and unreacted di(isodecyl) 4,5-epoxycyclohexyl-1,2-dicarboxylate and dibutyl maleate. The residue, which weighed 407 grams, had an iodine number of 5.2, a saponification number of 292, and an oxirane oxygen content of 2.05%.

Comparative Example A

An addition product was prepared by heating a mixture of 395 grams (1 mole) of dioctyl tetrahydrophthalate, 228 grams (1.1 moles) of dibutyl fumarate, and 18.7 grams of tert. butyl peroxide at 150° C. for 7.5 hours. The reaction mixture was heated to 225° C./3 mm. to distill off water and unreacted starting materials. The residue had an iodine number of 31.7 and a saponification number of 312.9 (calculated for the 1:1 addition product of dioctyl tetrahydrophthalate and dibutyl fumarate:iodine number, 41; saponification number, 310).

Comparative Example B

An addition product was prepared by heating a mixture of 399 grams of dioctyl tetrahydrophthalate, 228 grams of dibutyl maleate, and 15.7 grams of tert. butyl peroxide at 150° C. for 6.5 hours. The reaction mixture was heated to 225° C./3 mm. to distill off water and unreacted starting materials. The residue, which weighed 503.8 grams, had an iodine number of 35.9 and a saponification number of 303.3 (calculated for the 1:1 addition product of dioctyl tetrahydrophthalate and dibutyl maleate:iodine number, 41; saponification number 310).

Example 3

Plasticized polyvinyl chloride compositions were prepared by the following procedure: To a mixture of 100 parts of polyvinyl chloride (Geon 101 EP), 5 parts of epoxidized soybean oil, 2 parts of a barium salt-cadmium salt-organic phosphite stabilizer (Nuostabe V134), and 0.5 part of stearic acid was added 45 parts of a plasticizer. The mixture was blended at room temperature and then charged to a two-roll, steam-heated, differential speed mill whose roll surface temperature was maintained at 300° F. The mixture was milled for 5 minutes and then removed from the rolls as a flexible sheet 0.020 inch in thickness. The properties of the compositions, which were determined by standard test methods, are given in the table that follows.

TABLE

| Plastizer | Product of Ex. 1 | Product of Ex. 2 | Product of Comp. Ex. A | Product of Comp. Ex. B | Di-2-ethylhexyl Phthalate |
|---|---|---|---|---|---|
| Tensile Strength (p.s.i.) (ASTM D412-51T) | 2,860 | 2,930 | 3,210 | 3,000 | 2,680 |
| 100% Modulus (ASTM D412-51T) | 1,970 | 1,775 | 1,880 | 1,770 | 1,400 |
| Elongation (percent) (ASTM D412-51T) | 335 | 380 | 360 | 355 | 345 |
| Durometer Hardness (at 15 sec.) (ASTM D676-49T) | 86 | 74 | 87 | 84 | 77 |
| Brittle Point (° C.) (ASTM D746-44T) | −14 | −22 | −28 | −35 | −31 |
| Volatility (percent) (ASTM D1203-52T) | 0.76 | 1.67 | 2.95 | 2.23 | 3.3 |
| Extraction by Mineral Oil (percent) | 1.09 | +0.15 | 1.35 | 4.25 | 2.48 |
| Extraction by Hexane (percent) | 13.0 | 2.3 | 13.6 | 16.3 | 13.0 |
| Extraction by Soapy Water (percent) | 1.37 | 1.07 | 1.87 | 4.25 | 0.68 |
| Heat Stability (Minutes at 180° C. before severe yellowing occurs) | 90 | 90 | 180 | 120 | 120 |
| Light Stability (Hours in Atlas Fadeometer before exudation and degradation occur) | >500 | >500 | [1] 321 | | >500 |

[1] Tacky.

From the data in the foregoing table it will be seen that the products of Examples 1 and 2 are superior to the comparative materials in the permanence properties, that is, volatility and resistance to extraction by solvents, and at least equivalent to these materials in the other properties tested.

What is claimed is:

1. An epoxidized polycarboxylate selected from the group consisting of (a)
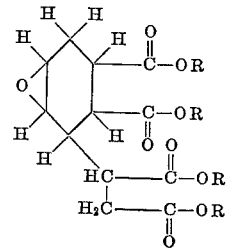

(b)
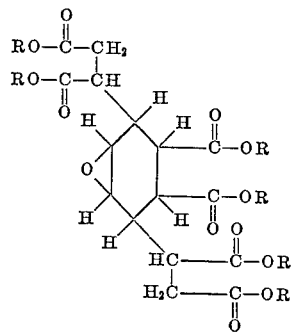

and (c) mixtures thereof, wherein each R represents an alkyl group having from 4 to 10 carbon atoms.

2. The epoxidized polycarboxylate having the formula

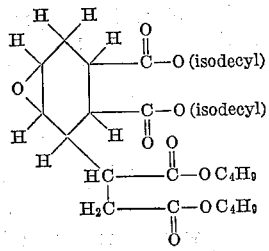

3. The epoxidized polycarboxylate having the formula

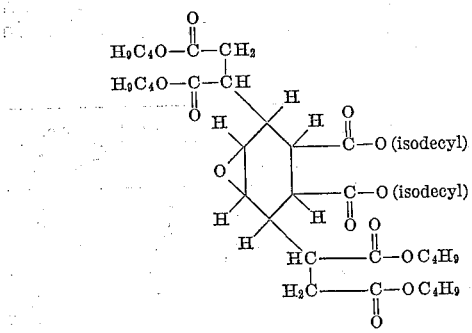

4. The process for the preparation of epoxidized polycarboxylates which comprises heating dibutyl fumarate with di (isodecyl) 4,5-epoxycyclohexane-1,2-dicarboxylate in the amount of at least one mole of said fumarate per mole of said 4,5-epoxycyclohexane-1,2-dicarboxylate at a temperature between approximately 30° C. and 250° C. in the presence of 1% to 10%, based on the weight of the reactants, of a free-radical promoter.

5. The process for the preparation of epoxidized polycarboxylates which comprises heating dibutyl fumarate with di (isodecyl) 4,5-epoxycyclohexane-1,2-dicarboxylate in the amount of 1 to 2 moles of said fumarate per mole of said 4,5-epoxycyclohexane-1,2-dicarboxylate at a temperature between 150° C. and 200° C. in the presence of 2% to 5%, based on the weight of the reactants, of a free-radical promoter.

6. The process for the preparation of epoxidized polycarboxylates which comprises heating dibutyl maleate with di (isodecyl) 4,5-epoxycyclohexane-1,2-dicarboxylate in the amount of at least one mole of said maleate per mole of said 4,5-epoxycyclohexane-1,2-dicarboxylate at a temperature between approximately 30° C. and 250° C. in the presence of 1% to 10%, based on the weight of the reactants, of a free-radical promotor.

7. The process for the preparation of epoxidized polycarboxylates which comprises heating dibutyl maleate with di (isodecyl) 4,5-epoxycyclohexane-1,2-dicarboxylate in the amount of 1 to 2 moles of said maleate per mole of said 4,5-epoxycyclohexane-1,2-dicarboxylate at a temperature between 150° C. and 200° C. in the presence of 2% to 5%, based on the weight of the reactants, of a free-radical promoter.

References Cited by the Examiner

UNITED STATES PATENTS

| | | | |
|---|---|---|---|
| 2,794,030 | 5/1957 | Phillips et al. | 260—348.5 |
| 2,862,904 | 12/1958 | Mullins | 260—30.4 |
| 2,924,583 | 2/1960 | Starcher et al. | 260—30.4 |
| 2,963,490 | 12/1960 | Rowland et al. | 200—348 |
| 2,999,866 | 9/1961 | Starcher et al. | 260—348 |
| 2,999,868 | 9/1961 | Phillips et al. | 260—348 |
| 3,071,600 | 1/1963 | Tinsley | 260—348 |

JOHN D. RANDOLPH, *Acting Primary Examiner.*

M. LIEBERMAN, NICHOLAS RIZZO. WALTER A. MODANCE. *Examiners.*